United States Patent
Proulx et al.

(10) Patent No.: US 7,828,155 B2
(45) Date of Patent: Nov. 9, 2010

(54) THERMOPLASTIC INJECTION MOLDING METHOD FOR CAPPING A TUBULAR FILTRATION MEDIUM

(75) Inventors: Stephen P. Proulx, Boxboro, MA (US); Brian Hillier, Lowell, MA (US); David DeCoste, Chelmsford, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 11/291,338

(22) Filed: Dec. 1, 2005

(65) Prior Publication Data

US 2006/0138038 A1    Jun. 29, 2006

Related U.S. Application Data

(60) Provisional application No. 60/638,596, filed on Dec. 23, 2004.

(51) Int. Cl.
*B01D 63/14* (2006.01)
*B29C 45/14* (2006.01)
*B01D 63/00* (2006.01)
*B29C 45/00* (2006.01)

(52) U.S. Cl. .................. 210/493.2; 264/DIG. 48; 264/271.1; 264/275; 264/279; 55/DIG. 5; 55/521; 210/321.86

(58) Field of Classification Search ............ None
See application file for complete search history.

(56) References Cited

U.S. PATENT DOCUMENTS

| | | | |
|---|---|---|---|
| 2,732,032 A | 1/1956 | Sandison | |
| 3,013,667 A | 12/1961 | Jackson et al. | |
| 3,026,609 A * | 3/1962 | Bryan | 29/419.1 |
| 3,457,339 A | 7/1969 | Pall et al. | |
| 3,753,544 A | 8/1973 | Hodgkins | |
| 3,850,813 A | 11/1974 | Pall et al. | |
| 3,869,392 A | 3/1975 | Wolf | |
| 4,078,036 A | 3/1978 | Keefer | |
| 4,392,958 A | 7/1983 | Ganzi et al. | |
| 4,588,464 A * | 5/1986 | Miyagi et al. | 156/218 |
| 4,956,089 A * | 9/1990 | Hurst | 210/484 |
| 5,028,330 A * | 7/1991 | Caronia et al. | 210/493.2 |
| 5,164,136 A * | 11/1992 | Comert et al. | 264/232 |
| 5,350,515 A | 9/1994 | Stark et al. | |
| 5,536,290 A | 7/1996 | Kwon | |
| 5,660,608 A | 8/1997 | Bartholome | |

(Continued)

FOREIGN PATENT DOCUMENTS

DE    3925511    8/1990

(Continued)

*Primary Examiner*—Krishnan S Menon
*Assistant Examiner*—Madeline Gonzalez

(57) ABSTRACT

A method for over-molding a tubular filter element 16, at least at one end 16b thereof, with a thermoplastic end cap 12. The over-molding method can be used to manufacture easily and cost-effectively a filter cartridge, of good durability, from an unprecedented range of polymeric materials and components. The thermoplastic over-molding method does not require pre-lamination of said end 16b, and can be performed at temperatures and pressures that do not result in undesirable morphological changes in the tubular filtration medium. Exemplary filter cartridges made through the over-molding method comprise a tubular filtration medium interposed between thermoplastic end caps, the thermoplastic material of the end caps infiltrating the tubular filtration medium, thereby creating mechanical interlock zones at the ends thereof.

13 Claims, 3 Drawing Sheets

U.S. PATENT DOCUMENTS

| | | | |
|---|---|---|---|
| 5,698,059 A * | 12/1997 | Bilski et al. | 156/273.5 |
| 5,730,766 A | 3/1998 | Clements | |
| 5,741,421 A | 4/1998 | Erdmannsdoerfer et al. | |
| 5,919,279 A | 7/1999 | Merritt et al. | |
| 6,045,600 A | 4/2000 | Michaelis et al. | |
| 6,345,721 B1 | 2/2002 | Durre et al. | |
| 6,723,270 B1 * | 4/2004 | Sugiyama et al. | 264/255 |
| 2003/0000874 A1 | 1/2003 | Proulx et al. | |
| 2006/0249443 A1 * | 11/2006 | Chilton et al. | 210/493.2 |

FOREIGN PATENT DOCUMENTS

| | | |
|---|---|---|
| EP | 0085885 | 8/1983 |
| EP | 0213930 | 3/1987 |
| EP | 0448876 | 10/1991 |
| EP | 0705131 | 4/1996 |
| EP | 1203607 | 5/2002 |
| FR | 2140536 | 1/1973 |
| JP | 1148522 | 6/1989 |
| WO | WO 00/44485 | 8/2000 |
| WO | WO 2004/004864 | 1/2004 |

* cited by examiner

THERMOPLASTIC INJECTION MOLDING METHOD FOR CAPPING A TUBULAR FILTRATION MEDIUM

CROSS-REFERENCE RELATED APPLICATIONS

The present application claims the benefit of U.S. Provisional Patent Application No. 60/638,596, filed on Dec. 23, 2004. The entire contents incorporated herewith.

FIELD

In general, the present invention is directed to a method for capping a tubular filter cartridge, and more particularly, a method for injection molding a thermoplastic end cap integrally onto a tubular filtration medium.

BACKGROUND

Filter elements in a variety of materials and structures are commercially available and examples are described in U.S. Pat. Nos. 2,732,031; 3,013,667; 3,457,339; and 3,850,813. As illustrated therein, a sheet of filter material is formed into a cylinder or the like, often with pleats to increase the filter area, and the side edges and ends sealed. The ends are commonly sealed by potting in solidified liquid sealers such as epoxy or polyurethane resins, molten thermoplastics, or the like. The elements are then mounted in holders which provide connections to supply fluid to be filtered to the upstream side of the filter material and to remove filtrate from the downstream side. Commonly, tubular elements include a hollow internal porous support of metal or plastic, fluid is supplied to the exterior of the filter material, and filtrate is removed from the internal support.

For filtering fine particulates, thin fibrous or cast microporous membranes having a pore size from about 0.1 to 25 microns are used which have about 50-80% of their volume as voids. Such membranes are relatively weak and fragile, especially when pleated. Coarser permeable layers on one or both sides thereof are often used for support and to maintain flow channels between pleated membrane plies. Even when supported, however, failures occasionally occur at one of the seals, particularly at the upstream junction of the end sealer and membrane.

A number of procedures have been employed to improve the reliability of the end seals for tubular filter elements. Shallow, densely packed pleats for mutual reinforcement have been used. An extra layer of porous membrane has been employed at the ends. A strip of flexible plastic, for example a flexible polyurethane, has been applied to the membrane for reinforcement at the junction of membrane and sealer. None has been entirely satisfactory, especially for use with fragile cast microporous membranes in critical applications. The use of flexible reinforcing strips introduces additional materials and steps, reduces the effective filtering area, and increases the sources for extractables into the filtrate.

As an alternative, U.S. Pat. No. 4,392,958, issued to G. C. Ganzi and C. T. Paul on Jul. 12, 1983, describes a method and structure for sealing the ends of a tubular filter element. The method comprises providing a strip on non-porous film along the edge of a sheet of microporous filter material, the strip being joined to the filter material fluid-tight at its outer portion, but forming a free flap on its inner portion, forming the element with the strip at one end and over the upstream side of the filter material, embedding the end in liquid sealer to a depth terminating over the flap portion of the strip, and solidifying the sealer.

Although the "edge-seal" method described by Ganzi et. al. continues to be used productively and with good results, alternative means for sealing tubular filtration elements continue to be of interest.

SUMMARY

In response to the above need, the present invention provides a method for over-molding a tubular filter element at least at one edge thereof with a thermoplastic end cap. The method comprises the steps of: providing a die mold having a region thereof shaped substantially conforming to the outer contours of said thermoplastic end cap; then inserting said tubular filter element into the cavity such that said at least one edge is within said region; then injecting a sufficient quantity of molten thermoplastic material into said inner mold cavity to fill said region and thereby form said thermoplastic end cap; and the removing the end capped tubular filter element from said die mold after said molten thermoplastic material is sufficiently cured.

The inventive over-molding methodology can be used to manufacture easily and cost effectively filter cartridges, of good durability, from an unprecedented range of polymeric materials and components.

One embodiment of such filter cartridge comprises a pair of thermoplastic end caps, each formed of thermoplastic material; and a tubular filtration medium having first and second ends, comprising porous or fibrous material, positioned between the thermoplastic end caps with said first and second ends fixed respectively thereto at first and second interlock zones. In accordance with the present invention, the thermoplastic material of said end caps infiltrates the porous or fibrous material of the tubular filtration medium at each said interlock zones.

In light of the above, it is an objective of the present invention to provide a method for providing an end cap onto an end of a tubular filtration medium, wherein said method does not require pre-lamination of said end.

It is another objective of the present invention to provide a thermoplastic injection molding based methodology for providing an end cap onto an end of a tubular filtration medium, wherein said methodology can be performed at temperatures and pressure that does not result in undesirable morphological changes in the tubular filtration medium.

It is another object of the present invention to provide a method for over-molding a thermoplastic end cap onto a tubular filtration material, wherein the materials used for the end cap and tubular filtration material are dissimilar.

It is another object of the present invention to provide a filter cartridge comprising a tubular filtration medium interposed between thermoplastic end caps, wherein the thermoplastic material of the end caps infiltrates the tubular filtration medium, creating said interlock zones at the ends thereof.

These and other object of the present invention can be further understood in light of the following detailed description considered in conjunction with the accompanying drawings.

DETAILED DESCRIPTION

Figure 1:
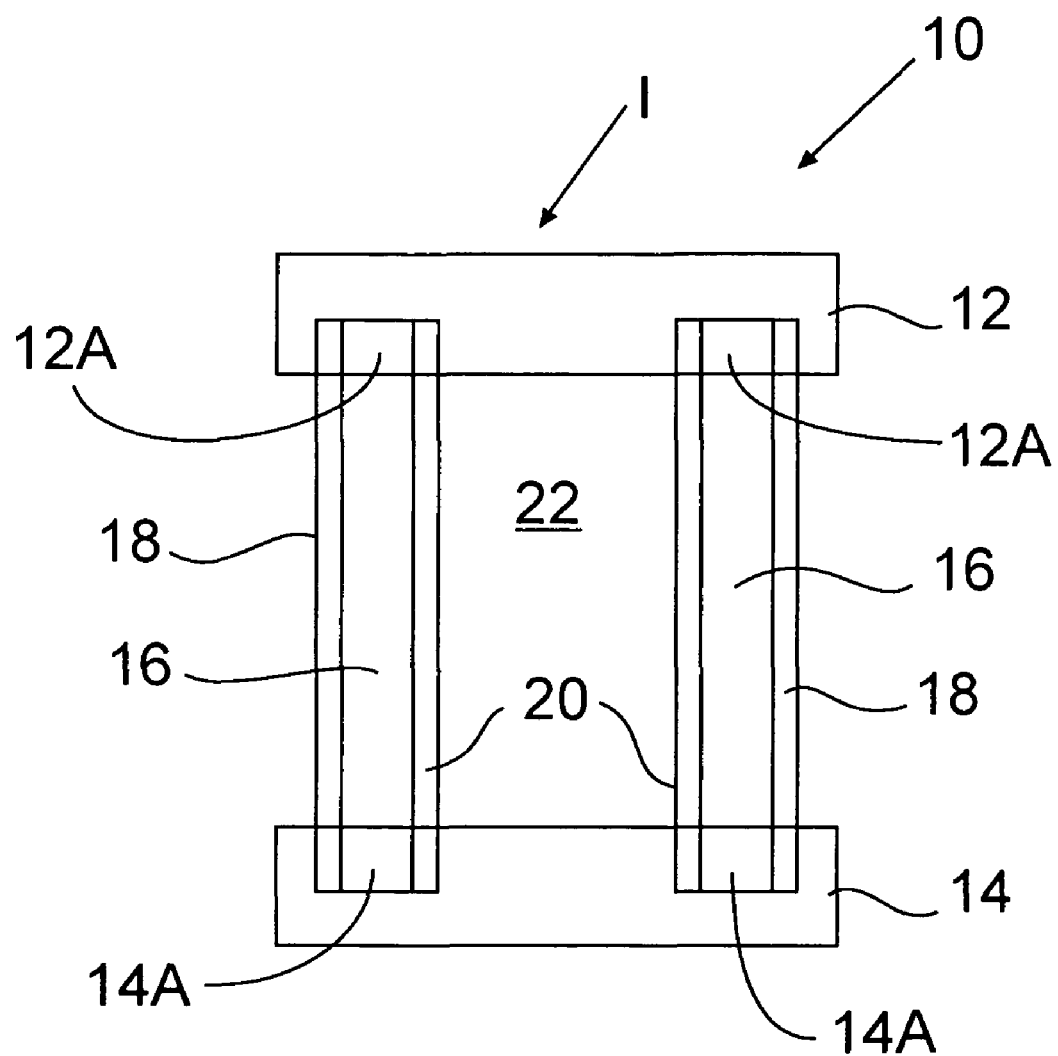
FIG. 1 illustrates schematically in cross-section a filter cartridge 10, structured according to an embodiment of the present invention, comprising a tubular filtration medium 16 interposed between over-molded thermoplastic end caps 12 and 14.
Figure 2:
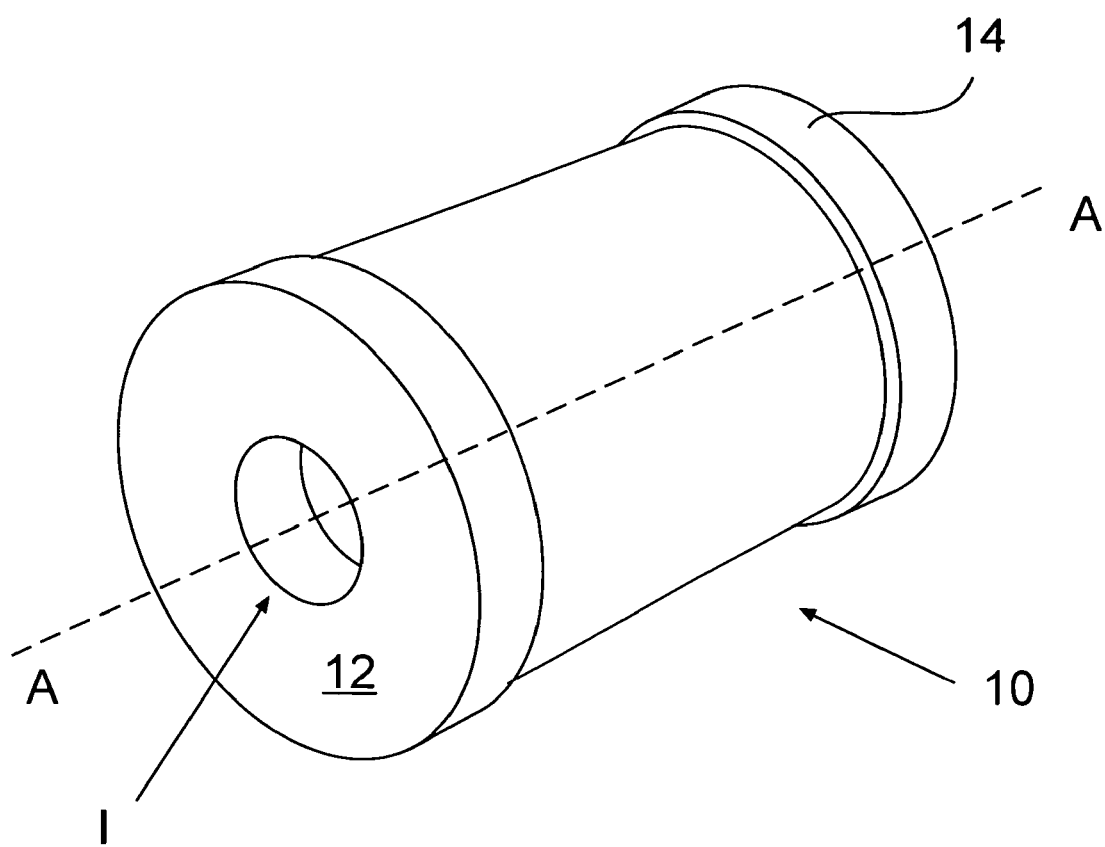
FIG. 2 illustrates schematically the exterior of the filter cartridge 10 illustrated in FIG. 1.

As illustrated in FIGS. 1 and 2, the present invention, according to one embodiment, provides a filter cartridge 10 comprising a pair of thermoplastic end caps 12, 14, with a tubular filtration medium 16 fixedly interposed therebetween. Each of the thermoplastic end caps 12, 14 are formed of a select thermoplastic material.

In general, the tubular filtration medium 16 comprises porous or fibrous material. The tubular filtration medium 16—having a central axis A-A and first and second ends—is positioned between the thermoplastic end caps 12, 14 such that its first and second ends are fixed respectively thereinto at first and second interlock zones 12a, 14a. At these zones, the thermoplastic material of the end caps 12, 14 infiltrates into porous or fibrous material of said tubular filtration medium 16.

The filter cartridge 10, configured in accordance with the present invention, is sufficiently durable to accommodate a wide variety of filtration applications conducted in a broad range of temperatures, pressures, and flow rates. The resultant structure is of equal of better durability because it can be manufactured utilizing a comparatively broad variety of materials, reducing chemical compatibility requirements (e.g., a concern largely with use of epoxy based potting materials) that in the past often limited strategies aimed towards providing more robust product configurations. Further, because the use of protective sealing films (such as used in U.S. Pat. No. 4,392,958) is not required, potential sources of leachable materials attributable to such films is also mitigated.

As stated, the thermoplastic endcaps are each formed of pre-selected thermoplastic material. It is important to the practice of the present invention that thermoplastic material selected have a melt temperature substantially in excess of the melt temperature at which the tubular filtration medium undergoes morphological change. For example, if the tubular filtration medium is a pleated polymeric membrane, the thermoplastic material selected should have a thermal melt temperature substantially below the thermal melt temperature of the polymer used to make said pleated membrane.

Thermoplastic materials useful for formation of the thermoplastic endcaps 12, 14 include, but are not limited to, polycarbonates, polyesters, nylons, PTFE resins and other fluoropolymers, acrylic and methacrylic resins and copolymers, polysulphones, polyethersulphones, polyaryl-sulphones, polystryenes, polyvinyl chlorides, chlorinated polyvinyl chlorides, ABS and its alloys and blends, polyurethanes, thermoset polymers, polyolefins (e.g., low density polyethylene, high density polyethylene, and ultrahigh molecular weight polyethylene and copolymers thereof), polypropylene and copolymers thereof, and metallocene generated polyolefins.

The thermoplastic end caps 12—aside from structural features related to the capping and thus fixing of the interposed tubular filtration medium 16—can include several other integrally formed structural features that serve other unrelated functions. Examples of such features, include, but are not limited to, an integrally formed inlet (see e.g., inlet I in FIGS. 1 and 2), an integrally formed manifold system or like flow paths or channels, alignment guides or couplers to assist in the installment of a filter cartridge into an outer filter housing, plugs and spacers, rigidity enhancing ribs, braces, and brackets, and other like structures that either provide additional filtration-related, assembly-related, and/or manufacture-related functionality.

The tubular filtration medium 16 (e.g., "substantially tubular" filtration medium 16) is made of porous or fibrous materials. Such materials can be provided, for example, as either a single unitary filter medium or a unitary composite filter medium comprising more than one layer of different or similar materials. Further the porous or fibrous materials can form, for example, a pleated configuration (the pleats thereof running substantially normal to the axis A-A of the device 10) or a wound sheet configuration of either a single layer or multiple spirally wound layers.

Porous materials include, for example, nitrocellulose, cellulose acetate, polycarbonate, polypropylene, PES, PVDF, polysulfone membranes. Such membranes can, for example, be macroporous or ultraporous, skinned or unskinned, symmetric or asymmetric, hydrophilic or hydrophobic, supported or unsupported, composite or not. Further, the membranes can also comprise or be coated with or otherwise include filter aids and like additives, or other materials which amplify, reduce, change, or otherwise modify the separation characteristics and qualities of the base underlying material, such as the binding, grafting, or provision of target specific binding sites or ligands onto an incorporated chromatographic bead or particle, or onto porous material itself.

Fibrous materials include, for example, woven or nonwoven fibers. The fibers can be natural (e.g., cotton, flax, jute, silk, and the like) or synthetic (e.g., cellulose, polypropylene, nylon, and glass fibers). Metallic fibers such as iron, copper, aluminum, stainless steel, brass, silver, and titanium can be used, as can clays with acicular lath-like or needle-like particles, such as montmorillonite, sepiolite, palygorskite, and attapulgite clays of this type. The fibers can be configured as meshes or netting of varying thickness, porosity, and density. Like the porous materials, the fibrous materials can also incorporate filter aids and like additives.

Regardless of the materials used, the tubular filtration medium and the interstitial spaces therethrough—as indicated above—should not collapse, shrink, distort, or otherwise be rendered fluid impermeable when exposed to a temperature near or approaching the thermal melt temperature of the thermoplastic material used to form the end caps 12 and 14. The temperature at which such morphological changes occurs in the tubular filtration medium material should be substantially above the thermal melt temperature of said thermoplastic material.

As indicated, the thermoplastic material of said end caps 12, 14, infiltrates the porous or fibrous material of said tubular filtration medium 16 at interlock zones 12a, 14a. The function of such infiltration is to mechanically secure together the end caps and the filtration medium. The thermoplastic material that infiltrates past upper outer surfaces of the medium mechanically engages within the depths thereof, locking and mating the two components together in a comparatively fixed and permanent matter.

The existence and degree of such infiltration of such material can be determined, for example, by microscopic inspection of an appropriate cross section of the area or region in which the medium meets the end cap. Such microscopic inspection should reveal at least partial intrusion below the outer interface of said junction. Since no edge film is utilized, the thermoplastic material will be in direct contact with the porous or fibrous material substantially throughout the areas of intrusions in interlock zones 12a, 14a. Further, the thermoplastic material within the interlock zone will appear substantially continuous with and have the same chemical composition as the thermoplastic material forming the predominant (if not entire) bulk of the end cap.

The degree of intrusion will vary depending on need and methodology. Complete intrusion is not required, although it is preferable, particularly for a filter device used for highly-regulated or otherwise demanding pharmaceutical processes, to ensure that the intrusion be at least sufficient (i.e., without air gaps and voids) to, for example, minimize so-called "dead zones", and/or maximize product durability, integrity, safety, and/or utility.

In desired embodiments of the present invention, the tubular filtration medium 16 is interposed between the thermoplastic endcaps 12, 14, together with and concentrically between inner and outer durable elements 18 and 20. In one embodiment, the inner and outer durable elements are rigid tubular screens or meshes that, among other functions, generally assist in confining and/or retaining the tubular form of the tubular filtration medium 16.

Typically, outer durable element 18 will provide a protective function, shielding the tubular filtration media from mechanical stresses and manipulation that can occur during, for example, during the installation of the filter cartridge 10 into a filter housing. The inner durable element typically to some extent also provides a protective function, but—particularly in the case of wound filtration material—provides a rigid, core, spool, or seat upon which said material is provided.

The utilization of outer and inner durable elements 18 and 20 is particularly useful during the manufacture of the filter cartridge 10 according to thermoplastic over-molding methodology described further herein below. During such method, the inner and outer durable elements 18 and 20 protect tubular filtration medium from bending or otherwise undesirably yielding to the weight of the molten thermoplastic material that is applied onto it.

There is no particular limitation as to the shape, function, rigidity or composition of the outer and inner durable element, other than it must not undergo morphological changes under the temperature and other condition expected in the inventive over-molding methodology. Hence, in all likelihood, the composition of the inner and outer durable elements 18 and 20 will be different from the specific thermoplastic material used to form the thermoplastic end caps 12 and 14. With that in mind, suitable material include, but are not limited to, polycarbonates, polyesters, nylons, PTFE resins and other fluoropolymers, acrylic and methacrylic resins and copolymers, polysulphones, polyethersulphones, polyarylsulphones, polystryenes, polyvinyl chlorides, chlorinated polyvinyl chlorides, ABS and its alloys and blends, polyurethanes, thermoset polymers, polyolefins (e.g., low density polyethylene, high density polyethylene, and ultrahigh molecular weight polyethylene and copolymers thereof), polypropylene and copolymers thereof, and metallocene generated polyolefins.

Figures 3A, 3B, 3C:
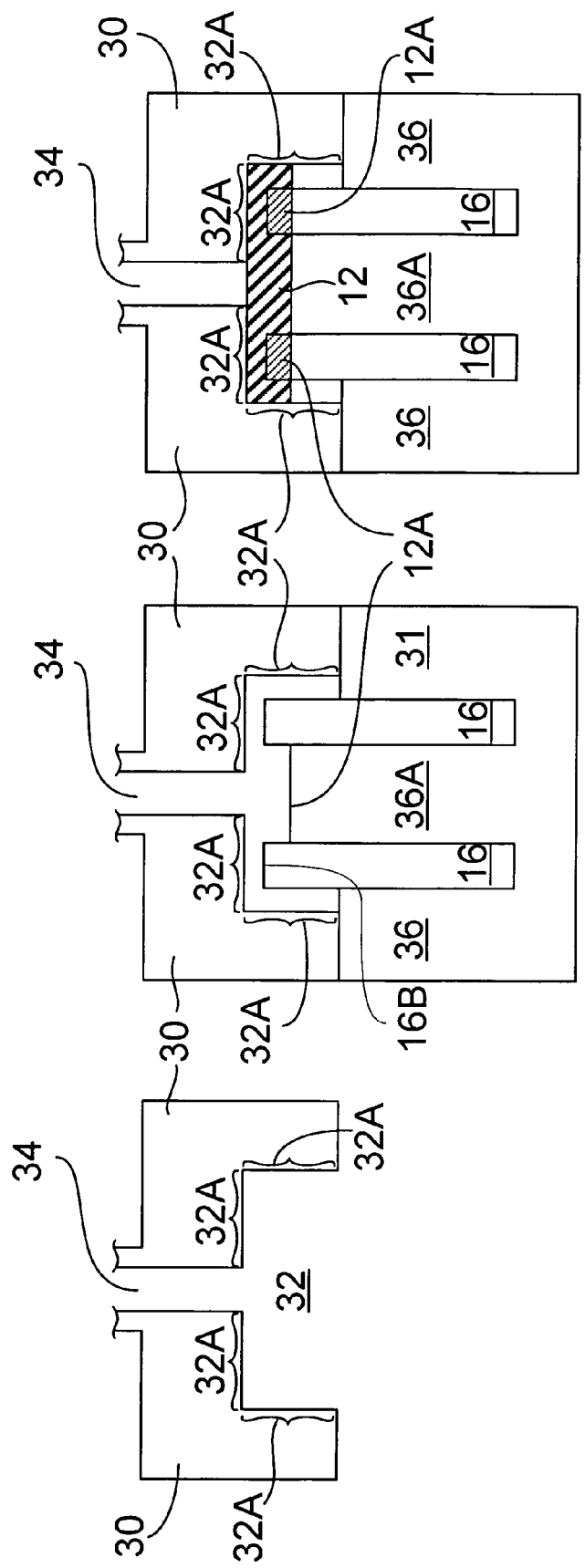
FIGS. 3A, 3B, and 3C illustrate schematically, according to an embodiment of the present invention, the steps of a method for over-molding a thermoplastic end cap 12 onto a tubular filtration medium 16.

The first step of the inventive methodology is to provide a die mold 30 having, as illustrated schematically in FIG. 3A, an inner mold cavity 32 and a supply duct 34 connected thereto.

Inasmuch as injection molding machines are currently available in several varied configurations, no limitation should be construed as to any specific structure or mechanism used for such die mold. Those skilled in the art in practicing the present invention can employ those die molds most suitable for their intended need. However, in the practice of the invention, the inner mold cavity 32 of the die mold 30 should be tooled, constructed, or otherwise provided to have a region 32a thereof that is shaped to substantially conform to the expected outer contours of said thermoplastic end cap 12.

It is not a requirement, however, for meeting "substantial" conformity that the region 32a be exactly identical to the expected outer contours of the finished commercially salable product. For certain filter cartridge product designs, post-mold processing steps can be employed to, for example, polish the end cap, remove residual burrs and sprue, and/or provide additional structural features (e.g., drilling inlet or outlet apertures) or ornamental features (e.g., hot stamping corporate logos into consumer automotive filters). In each such case, the outer contours of the "finished" filter cartridge product will not be identical to region 32a of the die mold. Regardless, they all "substantially" conform thereto, if not in the "final" product, then in the "intermediate" product.

Subsequent to obtaining and preparing for use an adequate die mold 30, the method includes the provision of a tubular filter element and inserting it into the cavity 32 such that a leading edge 16b of said tubular filter element is within said region 32a.

The tubular filter element, for these steps, can comprise either (a) the tubular filter medium 16 alone or (b) the tubular filter medium 16 arranged in combination with inner and/or outer durable elements 18 and 20. The details of such alternatives for the tubular filter element is described in detail hereinabove. In respect of the manufacture of pleated membrane filter cartridges of the type used for pharmaceutical applications, the combination with durable elements 18 and 20 is desired to the extent that it offers superior protection and support of the comparatively delicate pleated membrane.

The extent to which the leading edge of the tubular filter element into said region 32a of said die mold 30 can vary depends on, for example, the desired permanence and strength of the attachment of the end cap, the chemistry, viscosity, and rheology of the molten thermoplastic material; the porosity or permeability of the tubular filter medium 16; the configuration of the tubular filtration medium 16 (e.g., pleated, spirally-wound, etc.); the use (or not) of inner and/or outer durable elements 18 and 29; the pressure and heat expected to be used for molding; the operating and mechanical characteristics of the injection molding apparatus; and the commercial manufacturing factors the favor or disfavor higher or lower product yield and/or throughput.

To assure unimpeded and proper flow of molten thermoplastic material throughout region 32a of said die mold 30, the tubular filter element should not be pushed completely into the die mold such that the leading edge thereof touches the surface of said die mold, and thus, potentially obstructs or hinders flow from said supply duct 34 to the outer peripheral edges of region 32a.

In a desirable mode of operation the tubular filter element is inserted into region 32a of die mold 30 by means of holder 36, which—as is common practice in injection molding—is essentially the corresponding other half of die mold 30. In operation, holder 36 mates or otherwise couples with die mold 30 to seal inner mold cavity, enabling the exertion of pressure and maintenance of molding temperatures.

As shown in FIG. 3B, the holder 32a is structured to securely and firmly seat the tubular filter element, and such that, when holder 36 mates with die mold 30, the leading edge 16b of the tubular filter element is brought into the desired location within region 32a of the die mold.

As shown also in FIG. 3B, the holder is preferably equipped with a plug 36a that fits relatively snugly (but removably) within the inner lumen (see, passage 22 in FIG. 1) of the tubular filter element. The plug is desirably provided with (a) a distal end 38 that is configured to substantially obstruct fluid flow therethrough and further into said inner lumen, and (b) is of sufficient length to enable insertion sufficiently deep within said passage such that said distal end 38 substantially conforms to the desired outer contours of said thermoplastic end cap 12.

The plug 36 can either be integral with said holder 30 or can be a separate independent item (e.g., a removable cork or stopper).

It will be appreciated that when employed, particularly when molten thermoplastic material flows down into internal mold cavity (as in FIGS. 3A-3C) or laterally (not shown), the plug functions not only to stop molten material from flowing from the supply duct into and filling the inner lumen, it also function to assure that the molten material also flows radially out toward the outer peripheral areas of regions 32a. In circumstances involving low viscosity molten material pumped upward (against gravity) into the internal mold cavity 32, the use of a plug 36a may not be warranted.

As shown in FIG. 3C, once the tubular filter element is properly inserted into said die mold cavity 32, molten thermoplastic material is injected through said supply duct into said inner mold cavity 32 in a quantity sufficient to fill said region 32a, thereby forming said thermoplastic end cap 12. The end capped tubular filter element is removed from said die mold 30 after said molten thermoplastic material forming said thermoplastic end cap 12 has sufficiently cured.

As suggested above, when injected into the cavity, the molten thermoplastic material infiltrates fluid accessible pores and other like interstitial areas of the filtration material 16 of the tubular filtration element. The degree to which such infiltration occurs will depend on the same factors that are relevant to the determination of insertion depth, such as porosity, viscosity, pressure, heat, and time. Preferably, to accomplish a strong junction, complete infiltration (i.e., without air pockets, bubbles, cracks, and crevices) through the entire thickness and depth 12a of the filtration material 16 within region 32a should be sought.

Provided that the temperature of the molten thermoplastic material is substantially below that level which causes morphological change in the tubular filtration material 16, the collapse and/or compression of the pores (or the like) thereof should not occur, thus enabling conditions suitable for good infiltration of said molten materials.

Finally, regarding the ejection of the capped filtration element from the die mold 30, those skilled in the art will appreciate that it is not necessary that the thermoplastic material be completely cured prior to ejection. In general, the part can be ejected as soon as the thermoplastic material hardens sufficiently to retain its shape, and whereupon further curing can be accomplished, for example, in a subsequent downstream annealing process.

While the present invention has been described with reference to certain particular embodiments thereof, those skilled in the art, having the benefit of the teachings of the present invention set forth here, can affect numerous modifications thereto. The modifications are to be considered as being encompassed within the scope of the present invention as set forth in the appended claim.

What is claimed is:

1. A method for the manufacture of a filter cartridge, said filter cartridge consisting of a tubular filter element capped at first and second ends with a thermoplastic end cap fixed to the first and second ends at first and second interlock zones respectively, the method comprising the steps of:
    (a) providing a die mold having an inner mold cavity with an inner mold surface, a supply duct connected to said inner mold cavity, the inner mold cavity having a region thereof shaped to substantially conform to the outer contours of a thermoplastic end cap;
    (b) providing a tubular filter element comprising a porous or fibrous material and having a first end having a first outer peripheral leading edge, and a second end having a second leading outer edge;
    (c) inserting said tubular filter element into the inner mold cavity, prior to injecting a molten thermoplastic material, such that said first end having a first leading edge does not contact the inner mold surface but is within said region of the mold conforming to the outer contours of said thermoplastic end cap;
    (d) injecting a sufficient quantity of molten thermoplastic material through said supply duct into said inner mold cavity to fill said region of the mold conforming to the outer contours of said thermoplastic end cap, said molten thermoplastic material coming into direct contact with the first outer peripheral leading edge of the first end of said tubular filter element, infiltrating and flowing into and around the first end of the tubular filter element;
    (e) forming the thermoplastic end cap and a first interlock zone in the first end of the tubular filter element to mechanically secure together the thermoplastic end cap to the first end of the tubular filter element;
and
    (f) removing the end capped tubular filter element from said die mold after said molten thermoplastic material has sufficiently cured;
    wherein said thermoplastic material has a thermal melt temperature substantially below the thermal melt temperature of the tubular filter element.

2. The method of claim 1, wherein said tubular filter element has a passage running substantially co-axially along its length, and wherein the method further comprises the step of:
    removably inserting a plug into the passage of said tubular filter element prior to said injection step (d), said plug having a distal end that is configured to substantially obstruct fluid flow therethrough within said passage; said plug being inserted sufficiently deep into said passage such that said distal end substantially conforms to said desired outer contours of said thermoplastic end cap.

3. A method of capping a tubular filtration medium including a tubular filtration medium element capped at least at first and second ends thereof with a thermoplastic end cap without the use of an edge film comprising:
    (a) providing a die mold having an inner mold cavity with an inner mold surface, a supply duct connected to said inner mold cavity, the inner mold cavity having a region thereof shaped to substantially conforming to the outer contours of a thermoplastic end cap;
    (b) providing a tubular filter element comprising a porous or fibrous material and having a first end having a first outer peripheral leading edge, and a second end having a second leading outer edge;
    (c) inserting said tubular filter element into the inner mold cavity, prior to injecting a molten thermoplastic material, such that said first end having a first outer peripheral leading edge does not contact the inner mold surface but is within said region of the mold conforming to the outer contours of said thermoplastic end cap;
    (d) injecting a sufficient quantity of molten thermoplastic material through said supply duct into said inner mold cavity to fill said region of the mold conforming to the outer contours of said thermoplastic end cap, said molten thermoplastic material coming into direct contact with the first outer peripheral leading edge of the first end of said tubular filter element, infiltrating and flowing into and around the first end of the tubular filter element;

(e) forming the thermoplastic end cap and a first interlock zone in the first end of the tubular filter element to mechanically secure together the thermoplastic end cap to the first end of the tubular filter element; and (f) removing the end capped tubular filter element from said die mold after said molten thermoplastic material has sufficiently cured;

wherein said thermoplastic material has a thermal melt temperature substantially below the thermal melt temperature of the tubular filter element.

4. The method of claim 3, wherein said tubular filter element has a passage running substantially co-axially along its length, and wherein the method further comprises the step of:

removably inserting a plug into the passage of said tubular filter element prior to said injection step (d), said plug having a distal end that is configured to substantially obstruct fluid flow therethrough within said passage; said plug being inserted sufficiently deep into said passage such that said distal end substantially conforms to said desired outer contours of said thermoplastic end cap.

5. The method of claim 1, wherein said tubular filter element comprises a pleated membrane composed of a polymeric material.

6. The method of claim 1, wherein said tubular filter element further comprises an inner durable element overlapping the inner surface of said tubular filter element, and an outer durable element overlapping the outer surface of said tubular filter element, said inner and outer durable element configured for the passage of fluid therethrough.

7. A method of capping a tubular filtration medium consisting of a tubular filter element capped at first and second ends with a thermoplastic end cap attached to the first and second ends at first and second interlock zones respectively, wherein said method does not require pre-lamination of or a protective sealing film on the tubular filter element outer peripheral edges the method comprising the steps of:

(a) providing a die mold having an inner mold cavity with an inner mold surface, a supply duct connected to said inner mold cavity, the inner mold cavity having a region thereof shaped to substantially conforming to the outer contours of a thermoplastic end cap;

(b) providing a tubular filter element comprising a porous or fibrous material and having a first end having a first outer peripheral leading edge, and a second end having a second leading outer edge;

(c) inserting said tubular filter element into the inner mold cavity, prior to injecting a molten thermoplastic material, such that said first end having a first outer peripheral leading edge does not contact the inner mold surface but is within said region of the mold conforming to the outer contours of said thermoplastic end cap;

(d) injecting a sufficient quantity of molten thermoplastic material through said supply duct into said inner mold cavity to fill said region of the mold conforming to the outer contours of said thermoplastic end cap, said molten thermoplastic material coming into direct contact with the first outer peripheral leading edge of the first end of said tubular filter element, infiltrating and flowing into and around the first end of the tubular filter element;

(e) forming the thermoplastic end cap and a first interlock zone in the first end of the tubular filter element to mechanically secure together the thermoplastic end cap to the first end of the tubular filter element; and (f) removing the end capped tubular filter element from said die mold after said molten thermoplastic material has sufficiently cured;

wherein said thermoplastic material has a thermal melt temperature substantially below the thermal melt temperature of the tubular filter element.

8. The method of claim 7, wherein said tubular filter element has a passage running substantially co-axially along its length, and wherein the method further comprises the step of:

removably inserting a plug into the passage of said tubular filter element prior to said injection step (d), said plug having a distal end that is configured to substantially obstruct fluid flow therethrough within said passage; said plug being inserted sufficiently deep into said passage such that said distal end substantially conforms to said desired outer contours of said thermoplastic end cap.

9. The method of claim 7, wherein said tubular filter element comprises a pleated membrane composed of a polymeric material.

10. The method of claim 3, wherein said tubular filter element comprises a pleated membrane composed of a polymeric material.

11. The method of claim 10, wherein the pleated polymeric membrane tubular filter element further comprises an inner surface and an outer surface, wherein the inner surface is overlapped with an inner durable element, and the outer surface is overlapped with an outer durable element, said inner and outer durable elements configured for the passage of a fluid therethrough.

12. The method of claim 5, wherein the pleated polymeric membrane tubular filter element further comprises an inner surface and an outer surface, wherein the inner surface is overlapped with an inner durable element, and the outer surface is overlapped with an outer durable element, said inner and outer durable elements configured for the passage of a fluid therethrough.

13. The method of claim 9, wherein the pleated polymeric membrane tubular filter element further comprises an inner surface and an outer surface, wherein the inner surface is overlapped with an inner durable element, and the outer surface is overlapped with an outer durable element, said inner and outer durable elements configured for the passage of a fluid therethrough.

* * * * *